United States Patent [19]
Eichelberger et al.

[11] 4,441,015
[45] Apr. 3, 1984

[54] COOKING APPARATUS EMPLOYING A ROTISSERIE MODE WITH STATIONARY FOOD

[75] Inventors: Charles W. Eichelberger, Schenectady; Robert J. Wojnarowski, Ballston Lake, both of N.Y.; William D. Ryckman, Jr., Orange, Conn.

[73] Assignee: General Electric Company, Schenectady, N.Y.

[21] Appl. No.: 336,806

[22] Filed: Jan. 4, 1982

[51] Int. Cl.³ .............. H05B 1/02; F27D 11/02; F24C 7/04
[52] U.S. Cl. ..................... 219/411; 99/447; 219/401; 219/486
[58] Field of Search ............ 219/411, 385, 395, 398, 219/401, 402, 405, 408, 409, 440, 480, 486; 99/447, 401; 126/273 R, 275 E

[56] References Cited

U.S. PATENT DOCUMENTS

| 2,720,158 | 10/1955 | Finizie | 219/401 |
| 3,003,409 | 10/1961 | Mills | 219/411 |
| 3,077,530 | 2/1963 | Chase | 219/401 |
| 3,154,004 | 10/1964 | Huck | 99/401 |
| 4,374,319 | 2/1983 | Guibert | 219/405 |

FOREIGN PATENT DOCUMENTS

| 2284243 | 7/1976 | France | 219/398 |
| 777777 | of 1955 | United Kingdom . | |
| 1126050 | of 1964 | United Kingdom . | |
| 1096730 | of 1966 | United Kingdom . | |

Primary Examiner—B. A. Reynolds
Assistant Examiner—Teresa J. Walberg
Attorney, Agent, or Firm—Geoffrey H. Krauss; James C. Davis, Jr.; Marvin Snyder

[57] ABSTRACT

A novel cooking oven provides a plurality of elongated heating rods which are parallel to one another and surround the foodstuff to be cooked. The rods are energized sequentially by current flow controlled in magnitude and time to produce either black baking heat from the heating rods or infrared radiation from the heating rods by heating them to a red color. By sequentially heating the rods, the heat source in effect rotates around the foodstuff to be cooked to produce equal and even browning equivalent to that obtained by conventional rotisserie cooking in which the foodstuff is rotated relative to a stationary heat source. The oven may also be used in other heating modes such as pressurized cooking by containing the apparatus in a pressurized vessel with the heat sources consisting of inherent heat sources which will produce browning and crisping while heating in the pressurized mode.

18 Claims, 28 Drawing Figures

FIG. 26. DUTY CYCLE & IR CONTENT FOR BROIL MODE

FIG. 27. DUTY CYCLE & IR CONTENT FOR BAKE BROIL 4,441,015

COOKING APPARATUS EMPLOYING A ROTISSERIE MODE WITH STATIONARY FOOD

RELATED APPLICATIONS

This application is related to application Ser. No. 336,805, filed Jan. 4, 1982, entitled "Cooking Apparatus Having Internal Pressurizing Source and Integral Heat Source".

BACKGROUND OF THE INVENTION

This invention relates to cooking apparatus and more particularly relates to cooking apparatus in which a plurality of heat sources surround the foodstuff to be cooked and are sequentially energized to produce the effect of rotisserie cooking without having to rotate the foodstuff relative to a fixed heat source.

Rotisserie cooking is well known and is used to obtain even broiling or browning of meats by rotating the meat relative to a stationary source of heat. Conventionally rotisseries employ a motor-driven spit to which the foodstuff to be cooked is fixed. It is therefore necessary to successfully mount the foodstuff on rotisserie forks or the like; this mounting is difficult, in the case of some foods, especially if one is to be assured that the food will stay on the rotisserie during the cooking process. The apparatus requires the use of motors, bearings, fork and rod assemblies and the like. In the event that rotational speed changes are desired, special motors or gear boxes are necessary. Conventional rotisserie broiling is also a smoky operation which splatters the oven cavity and creates clean-up problems. Moreover, when using rotisserie-type cooking, it is difficult to employ conventional meat thermometers or foodstuff thermometers since the foodstuff is rotating and a slide connection to the thermometer would be required, which is cost-prohibitive. A further difficulty with rotisserie cooking is that most of the energy is supplied by a broil coil disposed above the meat being cooked, since the use of a bake coil beneath the meat would receive meat drippings and create a fire hazard. Since rotisserie broiling is conventionally carried out with the oven door open, when done indoors, it produces smoke odors, heat and splatters, and increases fire hazard. In addition, the operation is energy inefficient.

BRIEF DESCRIPTION OF THE INVENTION

In accordance with the invention, a novel cooking apparatus is provided in which a plurality of parallel heating rods are disposed around the stationary foodstuff to be cooked and are sequentially energized for times sufficient to produce either baking heat energy or infrared energy for heating and browning the surface of the foodstuff to be cooked. By sequentially energizing the coils or heater elements with only one element on at any one time, the heat source is circulated around the foodstuff to produce the same effect as rotating the foodstuff relative to a stationary heat source in the rotisserie cooking manner.

The heating sources are preferably located so that drippings from the foodstuff will fall into an area free of heater rods and into a pan or the like. The heat rods are preferably disposed symmetrically around the foodstuff and typically three heating rods can be used spaced 120° from one another. These rods are preferably contained within a container having reflective walls so that during operation the infrared energy radiated from the heating rods will be principally directed at, and focused on, the foodstuff to be cooked. Preferably, the heating rods will be associated with parabolic or similar reflectors which will direct their energy directly toward the foodstuff to be cooked, which foodstuff is disposed in the center of the oven cavity.

The oven cavity of the invention is preferably one which can be sealed in the manner disclosed in aforementioned co-pending application Ser. No. 336,805. That application describes a novel oven which comprises a pressurizable container with integral bake and broil coils which are energized in either a black heating mode for baking, or in a red heated mode in which they produce a large amount of infrared radiation for browning of foodstuffs to be cooked. That apparatus permits the use of pressure cooking and simultaneous browning of the foodstuff being cooked. Similar apparatus can be modified to use the present invention wherein the heating rods are rearranged to symmetrically surround the foodstuff to be cooked and comprise a plurality, typically three or more, of heating rods which are sequentially energized to produce rotisserie-type cooking.

The oven of the invention can be a free-standing oven for rotisserie cooking only, or can be combined, as previously described, with the pressure cooking oven with integral heating sources described in application Ser. No. 336,805, incorporated herein in its entirety by reference. Moreover, the invention can be used as an option on the pressurized oven employing integral heat sources, where the heat sources of the oven can interchangeably be the conventional upper and lower broil and bake coils, respectively, or the symmetrically-disposed three or more heat coils of this invention which employ internal integral reflectors.

The heater rods which are employed preferably are resistive heating elements designated "Calrod" which is a registered trademark of the General Electric Company. Calrod heaters, as is well known, will remain black and produce warming or baking heat when energized for a short time by a given electric current. If, however, they are heated by the given electric current for a longer time, they will turn cherry-red and produce output energy containing a high percentage of infrared. A suitable control circuit is employed to cause electric current to be sequentially connected to the symmetrically disposed heating rods and to energize them for lengths of time necessary to produce either the black warming heat for baking or the high cherry red heat for infrared energy production.

DETAILED DESCRIPTION OF THE DRAWINGS

The drawings illustrate a preferred embodiment of the invention as a free-standing oven having a plurality of control modes including the novel rotisserie mode which may or may not employ pressure cooking with simultaneous browning. The structure shown is the interior structure and it will be understood that the structure will be enclosed within an outer decorative housing and will be provided with a suitable bottom support for supporting the self-standing oven either from the floor or from a cabinet top or the like.

Figure 1:
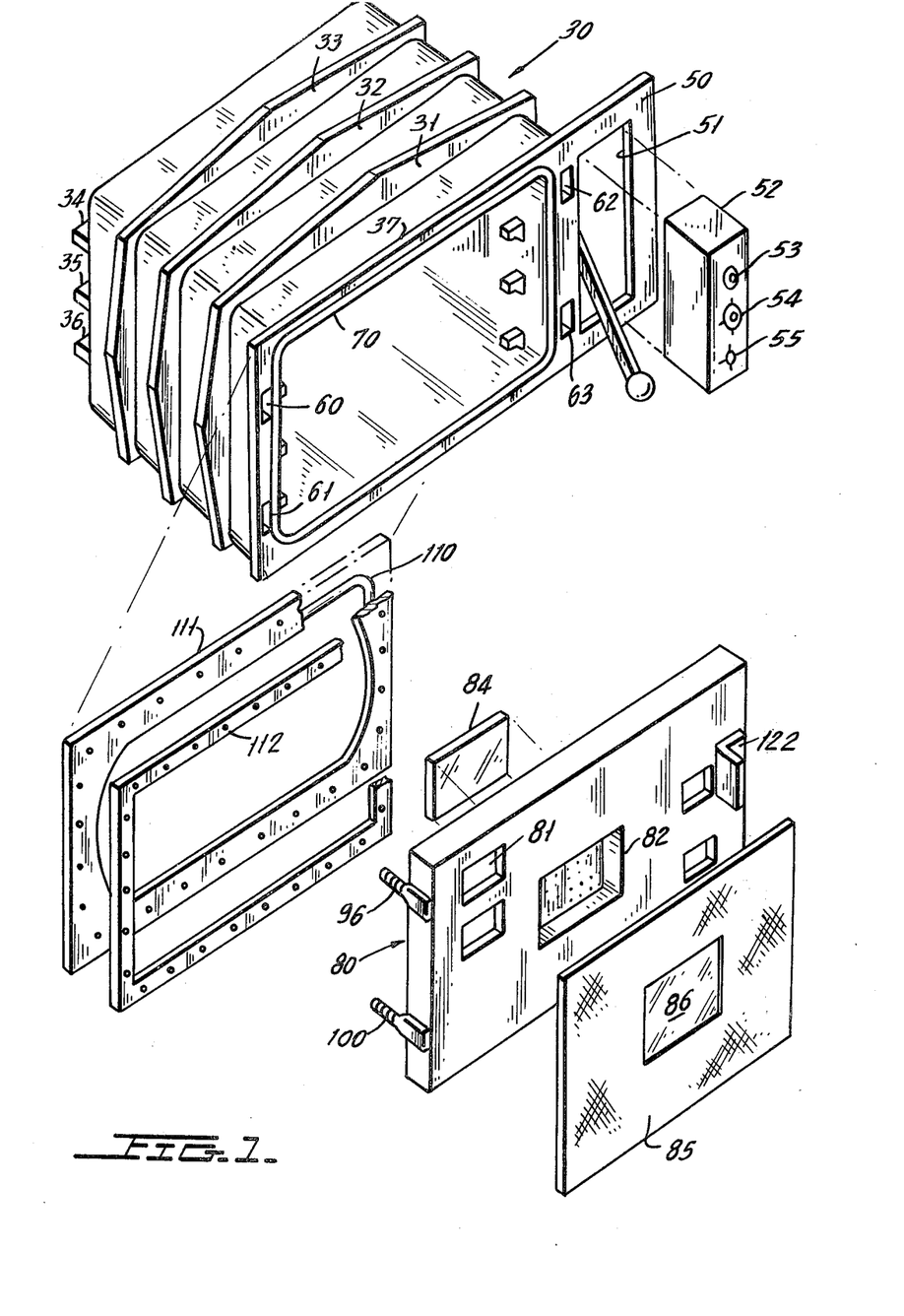
FIG. 1 is an exploded perspective view of an oven assembly which can employ the present invention.
Figures 2, 3, 3A, 4:
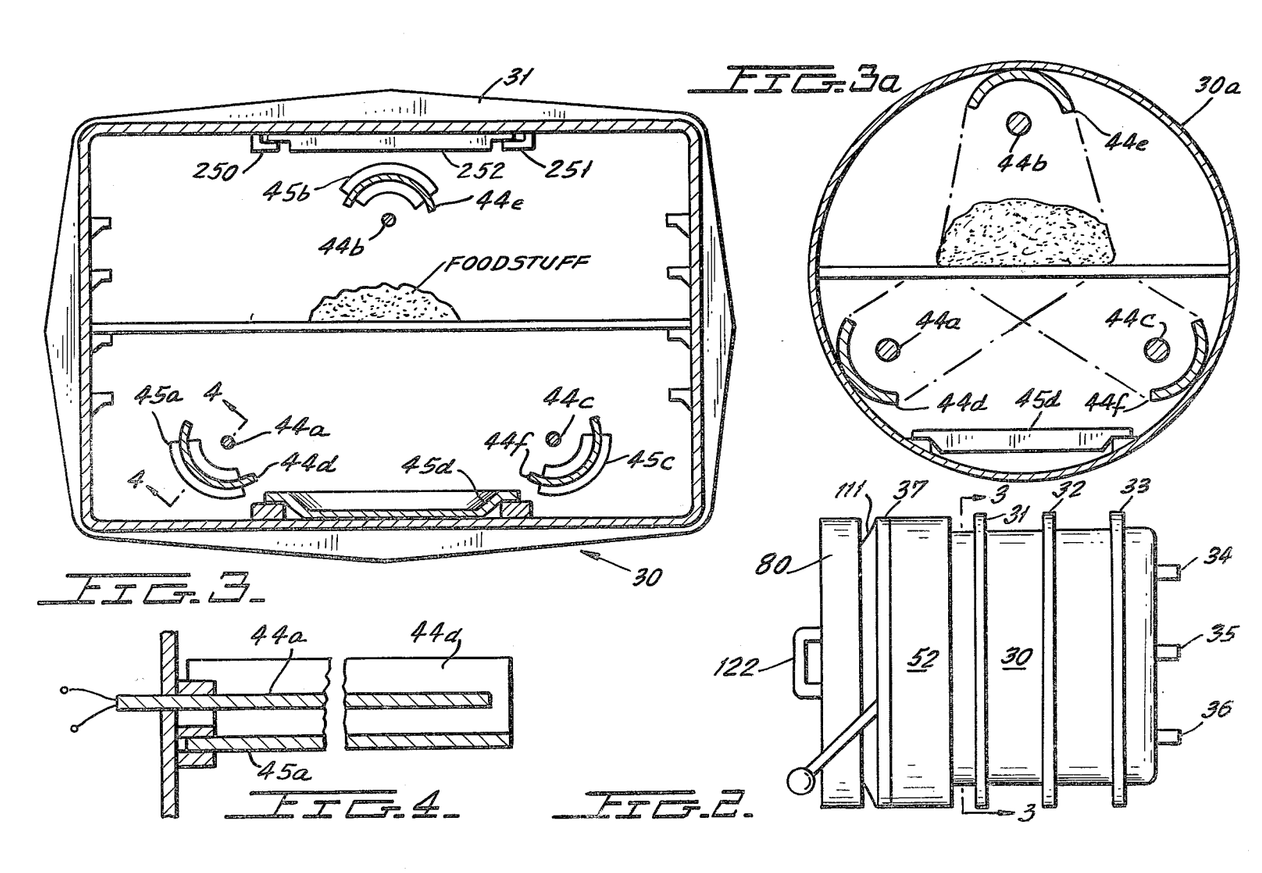
FIG. 2 is an elevation view of the side of the oven of FIG. 1.
FIG. 3 is a cross-sectional view of the oven of FIG. 2 taken across the section line 3—3 in FIG. 1 and shows heating rods arranged in accordance with the invention.
FIG. 3a is a cross-sectional view of a second embodiment of the invention, using a cylindrical cavity, rather than the rectangular cavity of FIG. 3.
FIG. 4 is a cross-sectional view of FIG. 3, taken across section line 4—4 in FIG. 3 and shows one of the heater rods and its reflector.

The overall oven assembly is shown in FIGS. 1 and 2. The oven has a generally rectangular form having a face which has a height of about 14 inches, a width of about 22 inches and a depth of about 14 inches. The opening of the oven may have a width of about 14 inches with the remaining 8 inches of width being devoted to space for a control circuitry housing.

Note that the use of the rectangularly shaped interior for the container provides the maximum amount of space for food to be cooked and further allows for multiple shelf position within the container. The rectangular shape also allows reflection of radiated heat waves onto food after minimum incidence on the surface of the cavity.

The oven consists of a main container body 30 which has five walls which are all perpendicular to an adjacent wall and which are joined to one another to form a generally rectangular enclosure having an open end which will be sealed by a door. Preferably, the walls are relatively thin and, for example, can have a thickness of about 0.125 inch when the walls are made of cast aluminum. Preferably, the region where the walls join one another will be smoothly rounded to improve the pressure withstanding capability of the cavity.

The cavity should be able to withstand at least five times the pressure encountered during pressurized cooking but still should use a minimum of material. To minimize the necessary thickness of the container wall, the container has linear reinforcing ribs such as ribs 31, 32 and 33 which encircle four walls of the container and rear ribs 34, 35 and 36 which extend across the back and fifth wall of the container. The pressure which can be withstood by the overall container is proportional to the square of the height of the reinforcing ribs. Ribs 31 to 36 may be formed integrally with the container or can be added to the exterior of the container after the container is formed. Reinforcements also provided by the front flange 37 which surrounds the open end of the container. Note that the ribs 31 to 36 can gradually taper from a relatively small height at the corners of the container to a relatively greater height at the center of each wall. For example, they may taper from a height of about ⅛ inch at the corners of walls to about 1 inch at the center of each wall.

In a preferred embodiment, the entire assembly including ribs 31 to 36 can be cast from aluminum as a unitary body. Casting is possible because the ribs 31 to 36 are parallel to one another. Thus conventional casting jaws can be withdrawn in a direction parallel to the direction of extension of the ribs. Other fabrication materials and processes could be used.

Figures 5, 6:
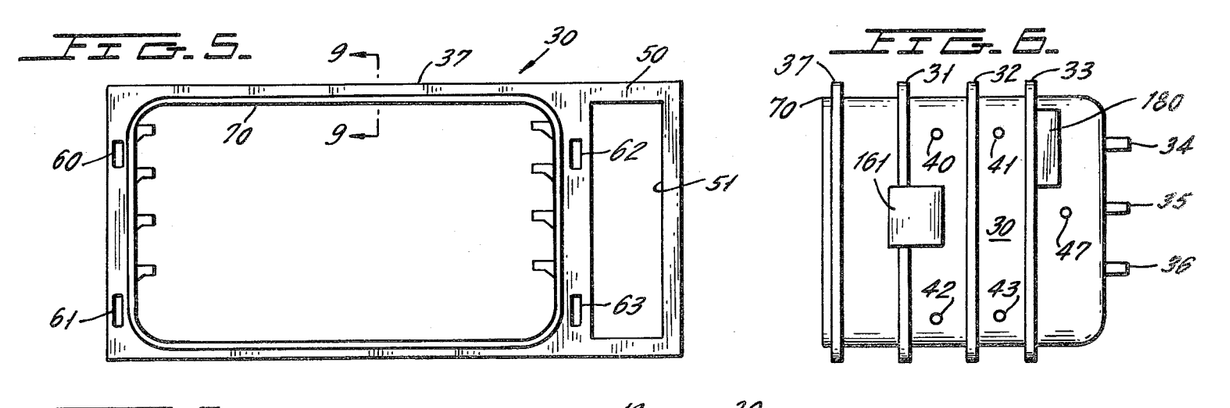
FIG. 5 is an elevation view of the front of the oven container casting of the oven of FIGS. 1, 2 and 3.
FIG. 6 is an elevation view of the side of the oven of FIG. 5.

During the casting or fabrication process, all necessary openings in the body of the container can also be formed. The necessary openings include openings 40, 41, 42 and 43 best shown in FIG. 6, which can receive upper and lower heating rods, as disclosed in the aforementioned co-pending application Ser. No. 336,805. Thus, the heating rods may have a reentrant or linear shape and may be of the type known as a "Calrod" which is a registered trademark of the General Electric Company. A lower heating rod structure identical to that of the upper rod may be received by the openings 42 and 43 of FIG. 6. All openings 40 to 43 are sealed to prevent loss of pressure through the openings.

Other openings are also formed in the container including opening 47 (FIG. 6) which is a pressure access hole and an opening such as opening 48, shown in FIG. 21, which communicates with the pressure control system to be later described.

Still other openings may be provided for connection to pressure gauges, safety pop-off type valves, oven or food temperature monitors to be connected to the electrical control system and the like.

Additional openings are formed in the rear surface of container 30 (not shown) which openings receive elongated heater rods 44a, 44b and 44c respectively which may each be of the Calrod type. As shown in FIGS. 3 and 4, each of rods 44a, 44b and 44c are associated with respectively parabolic reflectors 44d, 44e and 44f respectively. The reflectors 44d, 44e and 44f may be supported in cantilever from the rear surface of the oven cavity in arcuate supports 45a, 45b and 45c respectively which may be snap-in connectors which permit the snapping in and easy removal of reflectors 44d, 44e and 44f for cleaning and the like.

The parabolic reflectors have their central axes intersecting at a point approximately in the center of the oven container and are of a configuration generally to focus infrared radiation toward foodstuff to be cooked, such as the labeled foodstuff, which is supported on a removable rack secured on ledges which are integrally formed with the cavity 30 as shown in FIG. 3. Note that the rack supporting the foodstuff could be replaced by a spit, if desired.

The heater rods 44a, 44b and 44c can take shapes other than the round rod shown by the round rod produces particularly good results since it works efficiently with its respective reflector. Note that the interior walls of container 30 are reflective so that a large part of the radiation produced by the heating rods 44a, 44b and 44c ultimately will reach the foodstuff to be cooked.

FIG. 3a shows an alternate configuration for the oven container. Thus, in FIG. 3a the oven container may be similar to that previously described except that the interior cavity is a cylindrical cavity 30a. Reflectors 44d, 44e and 44f are contained within the container spaced from one another by 120° and act as reflectors for the cylindrical elongated parallel rods 44a, 44b and 44c respectively. The use of a cylindrical cavity improves the efficiency of the heater arrangement by ensuring that virtually all radiation produced by the lamps 44a-44c will be focused on the foodstuff supported on a rack or spit at the center of the cavity. Note, however, that the cavity of this shape is not as efficient for containing foodstuff as a rectangular cavity and does not permit adjustment of the location of food support racks of a common size. Note also that in the arrangement of FIGS. 3 and 3a that the heat rods 44a, 44b and 44c have axes which are located at the corners of an equilateral triangle. The equilateral triangle configuration of the lamps is such that one apex of the triangle is at the top of the oven while the other two apices are at the bottom of the cavity and in a plane which is parallel to the horizontal. As a consequence, there is a large space between the rods at the bottom of the oven container which is free to receive a drip pan 45d which can receive drippings from meat which is being broiled within the oven container. These drippings will not drip directly onto a hot element which could cause subsequent splattering of the drippings and production of large amounts of smoke.

Figure 7:
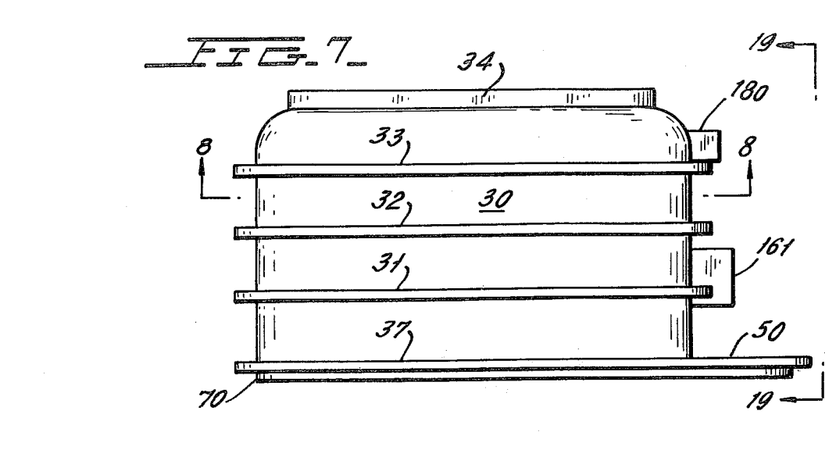
FIG. 7 is a plan view of FIG. 6.
Figures 8, 9:
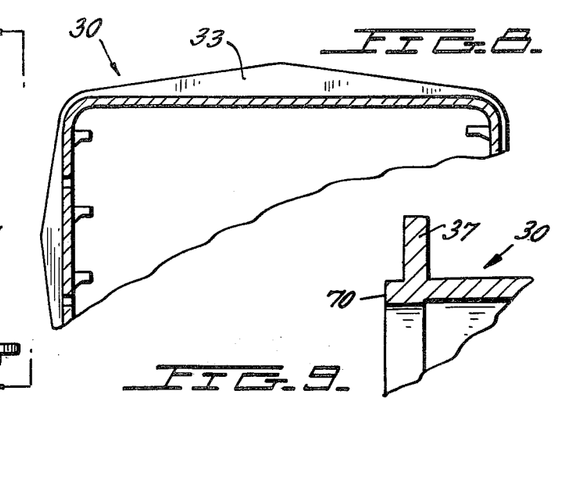
FIG. 8 is a cross-sectional view of FIG. 7 taken across the section line 8—8 in FIG. 7.
FIG. 9 is a cross-sectional view of a portion of the casting of FIG. 5 taken across the section line 9—9 in FIG. 5.

The front surface of the oven casting includes the front surface flange 37 which has an extenson region 50 (FIGS. 1, 5 and 7) which extends beyond a sidewall of container 30. Extension 50 has an opening 51 (FIGS. 1 and 5) which receives a housing 52 for control circuitry which is contained exteriorly of the oven cavity. Control circuit housing 52 has an upper control dial 53 which may be an oven temperature control, a central dial 54 which may control browning temperature, and a bottom control dial 55 which will enable the user to switch among broil, bake, toast and speed modes of cooking. The speed mode is the pressure cooking with browning. The bake and broil modes are both carried out in the rotisserie manner as will be described. The operation of dials 53, 54 and 55 will be later explained.

Flange section 37 is provided with openings 60 and 61 (FIGS. 1, 5 and 14) which receive door hinge elements. The front surface adjacent opening 51 contains openings 62 and 63 (FIGS. 1 and 5) which cooperate with the door latch structure for sealing the container as will be described.

Flange 37 is provided with an integral lip 70 (FIGS. 1, 5–7, 9 and 14–16) which is used as a support for a sealing ring which is a part of the pressure seal between the door 80 and the container 30 as will be later described.

The door 80, as shown in FIGS. 1, 2 and 10–20, may consist of a single aluminum casting, shown in FIGS. 10–13, and will have a width and height sufficient to cover the opening in the container body 30. Door 80 has a thickness and geometry to enable it to withstand cavity pressure and can, for example, be 1¼ inches thick. The door can have a honeycomb configuration on its front surface consisting of depressions such as depressions 81 distributed over the door front surface which leave a continuous web over the rear surface of the door having a thickness of about ⅛ inch and a network of a frontwardly facing, reinforcing webs having a thickness of about ⅛ inch.

The central region of the door is provided with a window 82 consisting of a thin web having a thickness of about ⅛ inch which is perforated by a plurality of rows and columns of openings which may have diameters, for example, of ⅛ inch and are of sufficient size and spacing to permit an observer to look through the openings to gain a view of the interior of the container 30 while the door 80 is closed. In order to seal the door at the window 82 and as shown particularly in FIG. 13, a sealing gasket 83 having a pattern of openings which matches that of the rows and columns of openings in window 82 extends across the full width of the window 82. A tempered transparent glass plate 84 extends across the gasket 83. A pair of retaining clamps 86 of FIG. 13 retain the glass 84 and gasket 83 in position.

Figures 10, 11, 12, 13:
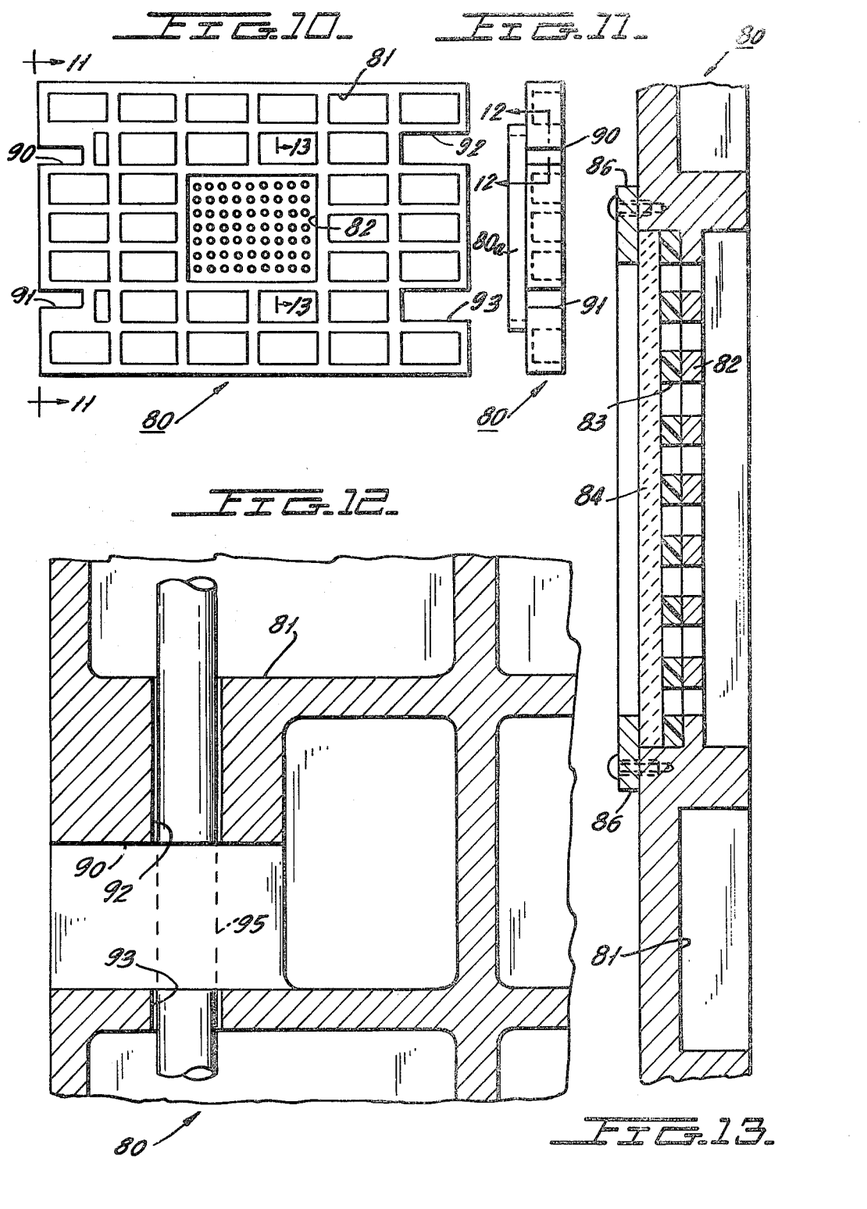
FIG. 10 is an elevation view of the front of the door of the container of the preceding figures.
FIG. 11 is a side elevation view of the door of FIG. 10 when seen from the line 11—11 in FIG. 10.
FIG. 12 is an enlarged cross-sectional view of the hinge portion of the casting of FIGS. 10 and 11 when taken across the section line 12—12 in FIG. 11.
FIG. 13 is an enlarged view of the door window region of the door of FIG. 10 when taken across the section line 13—13 in FIG. 10, and further illustrates the provision of a sealing gasket and transparent glass cover for the central window region.

It will be noted that the glass of plate 84 will not scatter exteriorly of the oven cavity in the event of an overpressurization accident. This is because the small holes in section 82 of the door prevent glass fragments from exploding into the room containing the oven. Glass plate 84 also acts as a heat insulator for the interior surface of door 80 so that heat removal from the oven by door 80 is substantially reduced.

The front surface of door 81 can be covered as shown in FIG. 1 by a decorative glass panel 85 which is suitably secured by brackets (not shown) over the full surface of the door 80. Panel 85 is provided with a blackened or opaque region surrounding a rectangular transparent region 86 which is in alignment with the window 82, thus masking the honeycombed aluminum front of the door 80.

The door casting of FIG. 10 is cast with slots 90 and 91 on its hinge end and slots 92 and 93 on its free end. Slot 90 is shown in greater detail in FIG. 12 which also shows the slot as having an opening 92 in a reinforced boss region of the door adjacent slot 90 and an opening 93 for receiving a steel pivot pin 95.

Figures 14, 15:
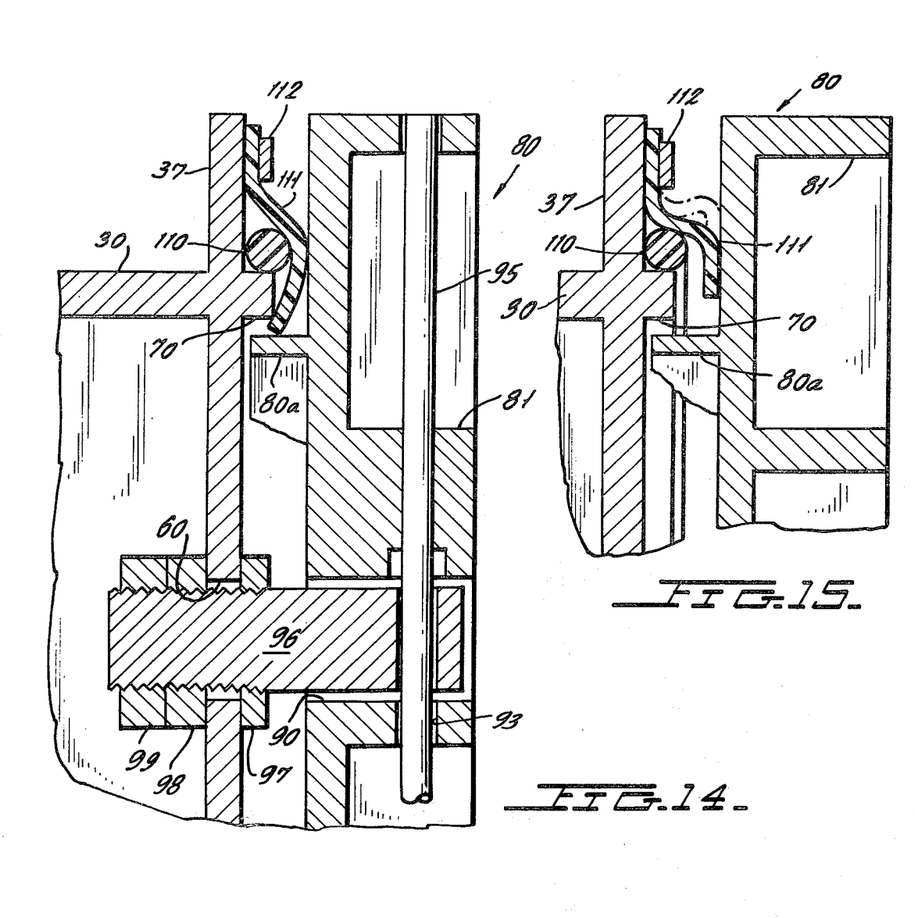
FIG. 14 is a cross-sectional view of a portion of the door and the facing portion of the oven interior and particularly illustrates the pressure seal assembly for the door and the hinge structure for the door.
FIG. 15 shows the seal structure with steam pressure within the container.

As shown in FIG. 14, steel pivot pin 95 pivotally receives a threaded hinge link 96 which is clamped to flange 37 of housing 30 as by the nuts 97, 98 and 99. Link 96, along with an identical hinge link, are pivotally supported at the hinge edge of the door 80 and are fixed to the flange 37 so that the door 80 can swing open and closed on pivot pin 95 and another identical pin contained within the opening of the door 80.

A novel pressure seal structure is provided to seal the door 80 against the periphery of flange 37 in order to seal the container 30. The pressure seal structure is shown in FIGS. 1, 14, 15 and 16 and includes an O-ring 110 which is secured on and surrounds the flange 70 of the container 30. The diameter of the O-ring 110 is greater than the length of flange 70 so that the O-ring will be compressed when the door is closed. The O-ring 110 is covered by a relatively thin flexible sheet of silicon rubber 111 which is clamped against the flange 37 by a clamping ring 112 which is attached suitably to the flange 37. Sheet 111 extends over seal 110 and flange 70 and cooperates with the seal 110 to form a sealed opening around the periphery of the cubicle 30.

Thus, FIG. 14 shows the door 80 sealed against container 30 with relatively low pressure within container 30. O-ring 110 and sheet 111 are compressed between the opposing surfaces of flange 37 and door 80. The initial pressure seal is created between the surface of door 80 and the line on sheet 111 which is pressed against door 80 by seal ring 110.

As pressure within container 30 increases and as shown in FIG. 15, door 80 moves slightly away from flange 37, and seal ring 110 is no longer compressed. However, the flat rubber sheet 111 will expand in the manner of a balloon and be forced against the door 80 in a positive manner and acts as the main seal in the pressure mode of operation. Note that if the pressure becomes excessive within the container 30, the seal 111 will blow out, as shown in FIG. 16, thus relieving the interior pressure.

Figure 16:
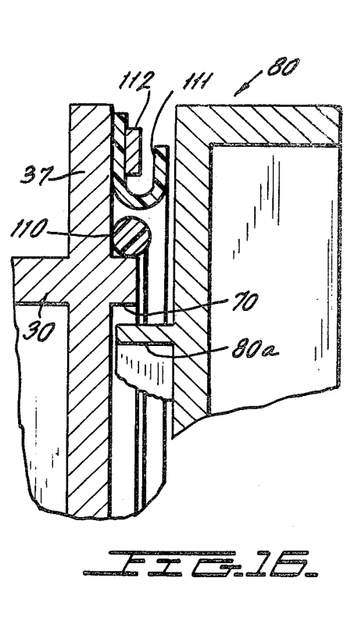
FIG. 16 shows the seal structure with the seal in a blowout condition due to excess pressure within the sealed container.

In the arrangement shown in FIGS. 14, 15 and 16, the seal ring 110 and sheet 111 are mounted on the flange 37 of the container. If desired, the seal ring 110 and sheet 111 could be mounted on the door. The sheet 111 will then be less subject to damage due to entry of pots and pans and the like into the oven cavity.

Figure 17:
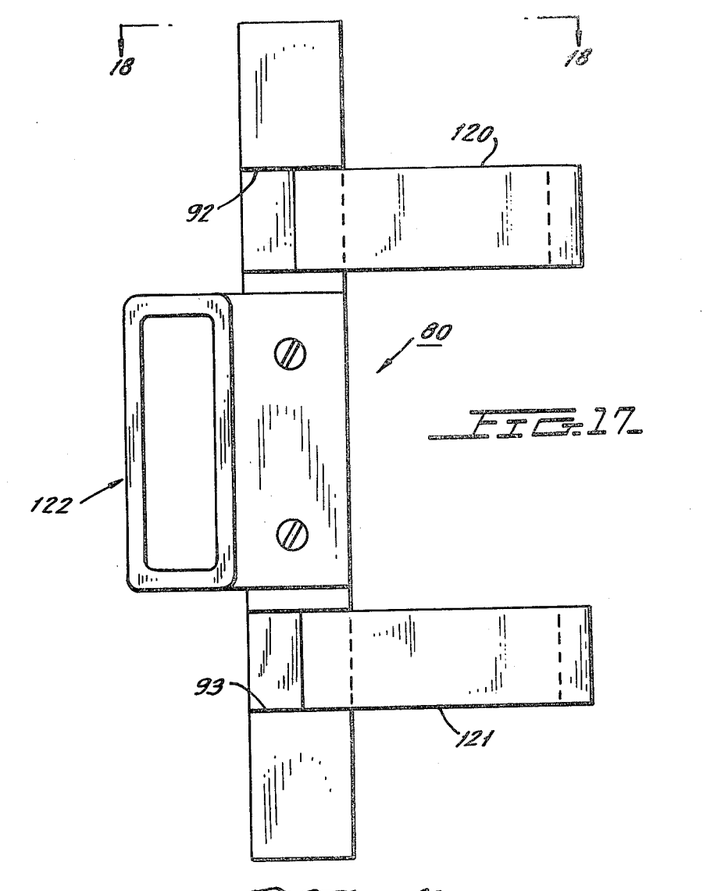
FIG. 17 is an elevation view of the free end of the door assembly and shows latching projections and a handle connected to the door end.
Figure 18:
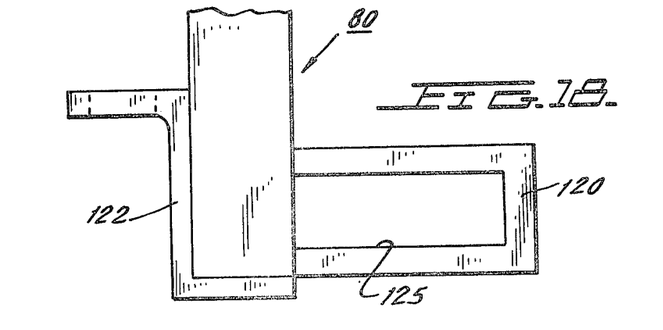
FIG. 18 is a plan view of FIG. 17 as seen from the line 18—18 in FIG. 17.
Figure 19:
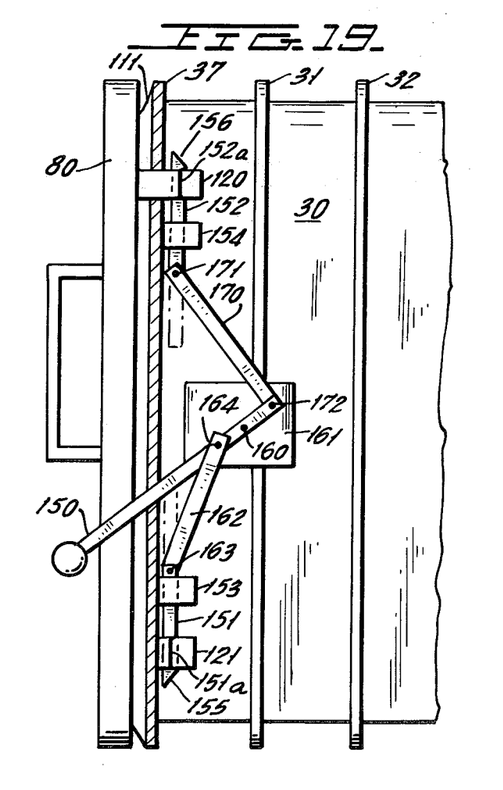
FIG. 19 is a cross-sectional view of the assembled oven as seen from a section line corresponding to section line 19—19 in FIG. 7, and particularly illustrates the door latch mechanism with the latches engaged and the door sealed to the container.
Figure 20:
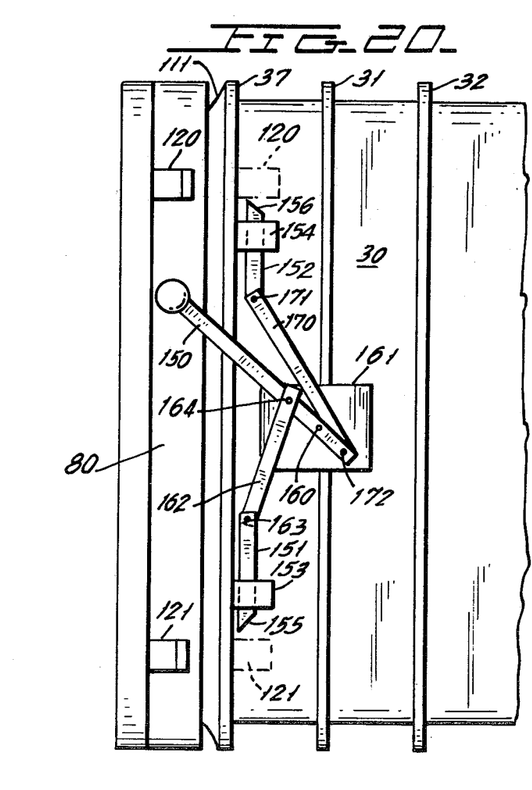
FIG. 20 shows the door latch mechanism of FIG. 19 with the latches open and door open.

The door latch assembly for latching the door in its closed and sealed position is shown in FIGS. 17-20. Referring to FIGS. 17 and 18, the free end of the door has extending latch pins 120 and 121 which are appropriately fixed in the slots 92 and 93 of the door 80. Note that a handle 122 is also fixed to the free end of the door as shown in FIGS. 17 and 18. Latch pins 120 and 121 have a U-shaped opening, shown as the U-shaped opening 125 for latch pin 120 in FIG. 18. These U-shaped openings operate to receive latching pawls having cam-shaped ends for forcing the free end of the door into a closed and sealed position. The latching pawls are best shown in FIGS. 19 and 20.

The latching pawls of FIGS. 19 and 20 are slidably mounted for longitudinal motion along a common axis by suitable guides 153 and 154, respectively, which are fixed to the outside surface of the side of container 30. The pawls are operated by an operating handle 150 which extends through the left-hand side of opening 51 (FIG. 5) of the extension 50. The opposite ends of pawls 151 and 152 have cam surfaces 155 and 156, respectively, and are arranged such that they will enter and engage the interior surface of latch pins 121 and 120, respectively, when they move to the latching position shown in FIG. 19.

The operating lever 150 is pivotally mounted by pivot pin 160 to a mounting block 161 which is secured to the side of container 30. A first connecting link 162 is pivotally connected between the upper end of latch pawl 151 and a point on lever 150 by the pins 163 and 164, respectively. In a similar manner, the lower end of pawl 152 is connected to operating rod 150 by the link 170 through the pins 171 and 172. As a result, when operating handle 150 rotates, the pawls will slide either toward one another or away from one another.

In the position shown in FIG. 19, the latch pawls engage the latch pins and hold the door 80 securely closed. In order to open the door, lever 150 is rotated upwardly to the position shown in FIG. 20. This motion will cause the retraction of latch pawls 151 and 152 out of their respective latch pins 121 and 120 so that the door 80 can be opened as shown in FIG. 20.

When the door 80 is to be held in a controlled open position so that air can circulate into the cavity of the oven during cooking, the door 80 is opened as shown in FIG. 2 and the lever 150 is returned to the latching position shown in FIG. 19 so that the latching pawls 151 and 152 move to the position shown in FIG. 19. The door 80 is then closed until the ends of the latch pins 120 and 121 engage the left-hand surfaces in FIG. 19 of the pawls 152 and 151, respectively. The door will remain in the open position set by the length of pawls 151 and 152 due to friction on the hinge links 96 and 100 of the door 80. Thus, the door will remain in a very accurately controlled open position dependent upon the length of the latch pins 120 and 121, so that baking, broiling and toasting can be carried out with a desired amount of air flow into the oven cavity.

In order to produce steam and thus pressure in the interior of the oven and as shown in FIG. 3, the oven may have two brackets 250 and 251 extending from its top which can slidably receive a shallow removable pan 252 which can be filled with water to a volume, for example, of 100 to 200 milliliters. The water containing pan 252 is placed very close to the upper heating rod 44 so that the water is quickly heated when steam generation is desired. Reflector 44e may have an elongated slot in its center (not shown) to permit direct impingement of energy from heater rod 44b onto the bottom of pan 252. Clearly, the pan 252 can be removed for non-steam cooking modes of operation. Note that the control algorithm may provide that the upper heating element 44b will be turned on initially for a longer period of time than the set cycle rate would call for in order to cause boiling and thus steam gneration to start more quickly.

Figure 21:
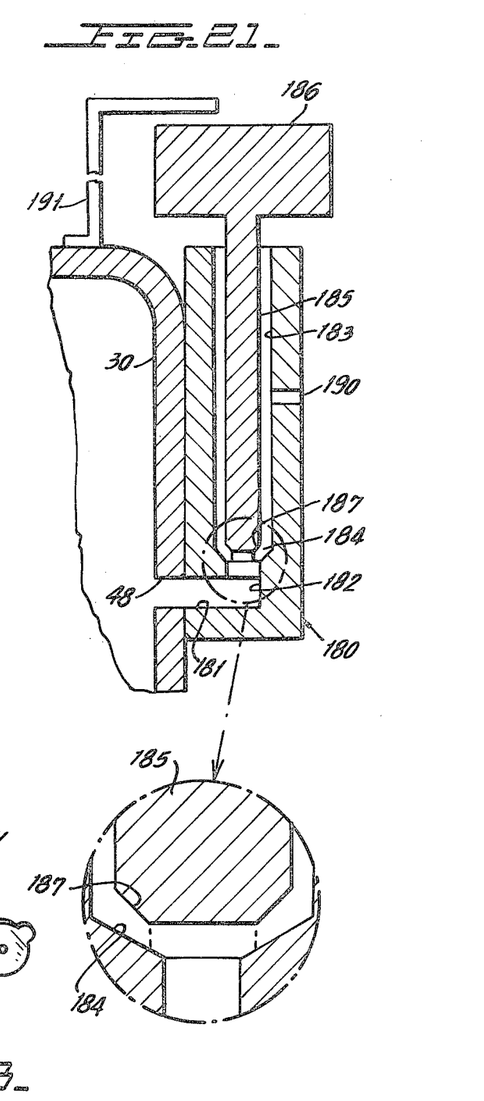
FIG. 21 is a cross-sectional view of the pressure control structure housing attached to the container.
Figure 22:
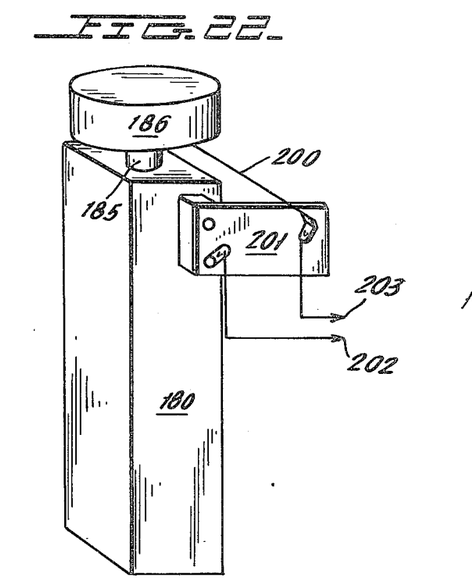
FIG. 22 is a perspective view of the pressure control switch which is added to the housing of FIG. 21 to provide an input to the control circuitry of the condition of the pressure relief structure.
Figure 23:
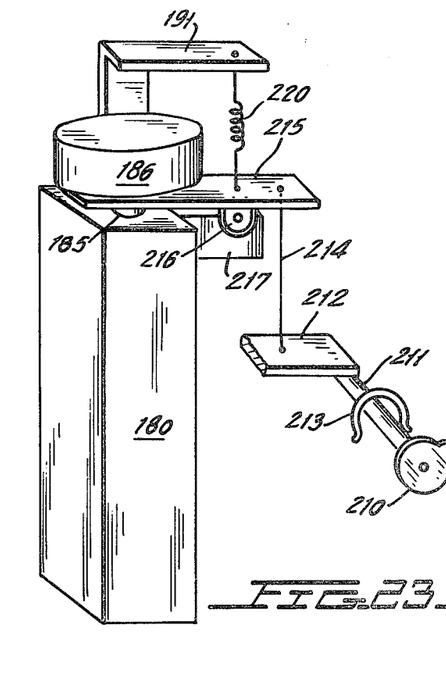
FIG. 23 is a perspective view of the pressure release mechanism which is used to modify the operation of the pressure control system of FIGS. 21 and 22.

Considering next the pressure control mechanism, this mechanism is best shown in FIGS. 21, 22 and 23. The pressure control system is contained in a rectangular solid aluminum block 180 which is fixed against the side of container 30 as shown, for example, in FIGS. 6 and 7. The pressure control body has a first opening 181 therein as shown in FIG. 21 which communicates with pressure inlet hole 48 in container 30. Opening 181 communicates with a first vertical opening 182 which is joined to a second vertical opening 183 over a tapered valve seat region 184.

The bottom of the steel rod 185, which is slightly smaller in diameter than opening 183, is provided with a chamfer 187 which, as will be later described, provides a hysteresis effect for the valve operation. The valve is closed when the bottom edge of chamfer 187 engages a line around the surface of tapered valve seat 184.

A pressure relief opening 190 is formed through the block 180 and into the second opening 183. An angle-shaped stop 191, which acts as a travel stop for the rod 185 and weight 186, is secured to container 30 as shown.

The structure described above for FIG. 21 will now serve as the main pressure regulation structure during the pressure cooking mode of operation. So long as the end of the rod 185 is below the pressure relief opening 190, the container 30 is sealed. However, once the bottom of rod 185 moves above the pressure relief opening 190, pressure is released from container 30 at a relatively rapid rate.

Pressure within container 30 will be controlled at a set pressure determined by the weight of rod 185 and of weight 186. So long as the product of the pressure within container 30 and the area of the bottom of chamfer 187 (which is sealed on seat 184) is less than the total weight of members 185 and 186, the valve remains closed. However, once this product exceeds the total weight of members 185 and 186, they move upwardly against the force of gravity or any other desired bias until pressure relief opening 190 is exposed.

The valve control has controlled amount of hysteresis because of the chamfer 187 on the bottom of rod 185. Thus, when chamfer surface 187 is seated in the valve seat 184, the cross-section presented to the interior pressure of chamber 30 is controlled by the inner diameter of the chamfer. Once the valve opens, however, the internal pressure of container 30 is applied over a surface extending to the outer diameter of the chamfer and thus of rod 185. Therefore, as soon as the rod 185 lifts off the valve seat, the cross-section presented to the pressure within container 30 increases substantially and the entire rod 185 and weight 186 will be forced against the stop 191. Pressure can then bleed through the hole 190 until it is reduced below the set pressure valve by an amount determined by the ratio of the inner and outer diameters of chamfer 187. The amount of hysteresis can be adjusted by adjusting the chamfer. Some degree of hysteresis is desirable to permit positive seating of the valve between pressure control cycles. Positive seating of the valve will also allow steam pressure to build more easily.

The position of the weight 186 and rod 185 may be monitored electrically by employing a spring steel wire 200 which normally engages the bottom of the weight 186 and maintains engagement with the bottom of the weight 186 until it rises to a level at which the bottom of the rod 185 moves off of the valve seat 186. Note that spring seal wire 200 can be held in any desired manner and can be held on a bracket 201 which is fixed to the block 180. Electrical terminals extending fom the block 180 and from the spring steel wire 200 are shown as terminals 202 and 203, respectively, in FIG. 22 and are taken to a suitable electronic control circuit.

The control arrangement of FIGS. 21 and 22 can incorporate the overriding pressure release mechanism shown in FIG. 23. This override can be used during steam cooking or sealed cooking modes which do not require over-pressure within the container, and can be used to manually release pressure at the end of a pressure cooking cycle. As shown in FIG. 23, an actuator mechanism operated by a control knob 210 is added which rotates a shaft 211 having a crank arm 212 at its end. The position of shaft 210 is maintained against unintended rotation by a suitable friction bushing 213. The crank arm 212 is connected by a connecting wire 214 to one end of a pivoted tab 215 which is pivoted at a fixed pivot point 216 mounted on a tab 217 extending from block 180. The left-hand end of the lever or tab 215 is disposed beneath the weight 186. A point just to the right of the pivot 216 is connected to the travel stop 191 by a return biasing spring schematically illustrated as the spring 220.

In a normal adjustment position, the spring 220 will maintain the lever 215 rotated in a counterclockwise direction so that it does not interfere with the movement of the weight 186 and its dependent rod 185. However, by rotating knob 210 counterclockwise, one can overcome the force of the return spring 220 and cause the lever 215 to rotate clockwise and thus raise the weight 186 and rod 185 to a point above the level of the pressure relief hole 190 in FIG. 21, thereby to release the pressure within the cavity shell 30.

Note that by turning the knob 210 carefully one can provide a vernier exposure of the pressure relief hole 190 and, therefore, can control the rate at which depressurization occurs following pressurized cooking. A slow depressurization rate is desirable because depressurization may cause water inside the cavity 30 to boil because pressure equilibrium has been reduced. If too rapid a depressurization occurs, frothing and boil-over may occur within the oven.

The novel control structure which has been described in FIGS. 21, 22 and 23 produces very good pressure control which is dependent only on the weight of the assembly of the rod 185 and weight 186. Moreover, pressure control will not change with age or use. Finally, because hot steam is constantly passing through all of the channels of the pressure control and because block 180 is immediately adjacent the container shell 30, the channels will remain as hot as the hot steam which passes through the control. This then allows for continuous purging of the channel and, because the pressurized steam is at a higher temperature than the ambient boiling point of water, the outside control system will remain essentially dry.

There is next described the electronic control system for controlling the energization of the heating rods 44a, 44b and 44c according to the various modes of operation of the novel oven. The mode of operation of the electronic circuitry which is shown in FIGS. 24 and 25 is controlled by controls 53, 54 and 55 in the control container 52 of FIG. 1.

Figure 25:
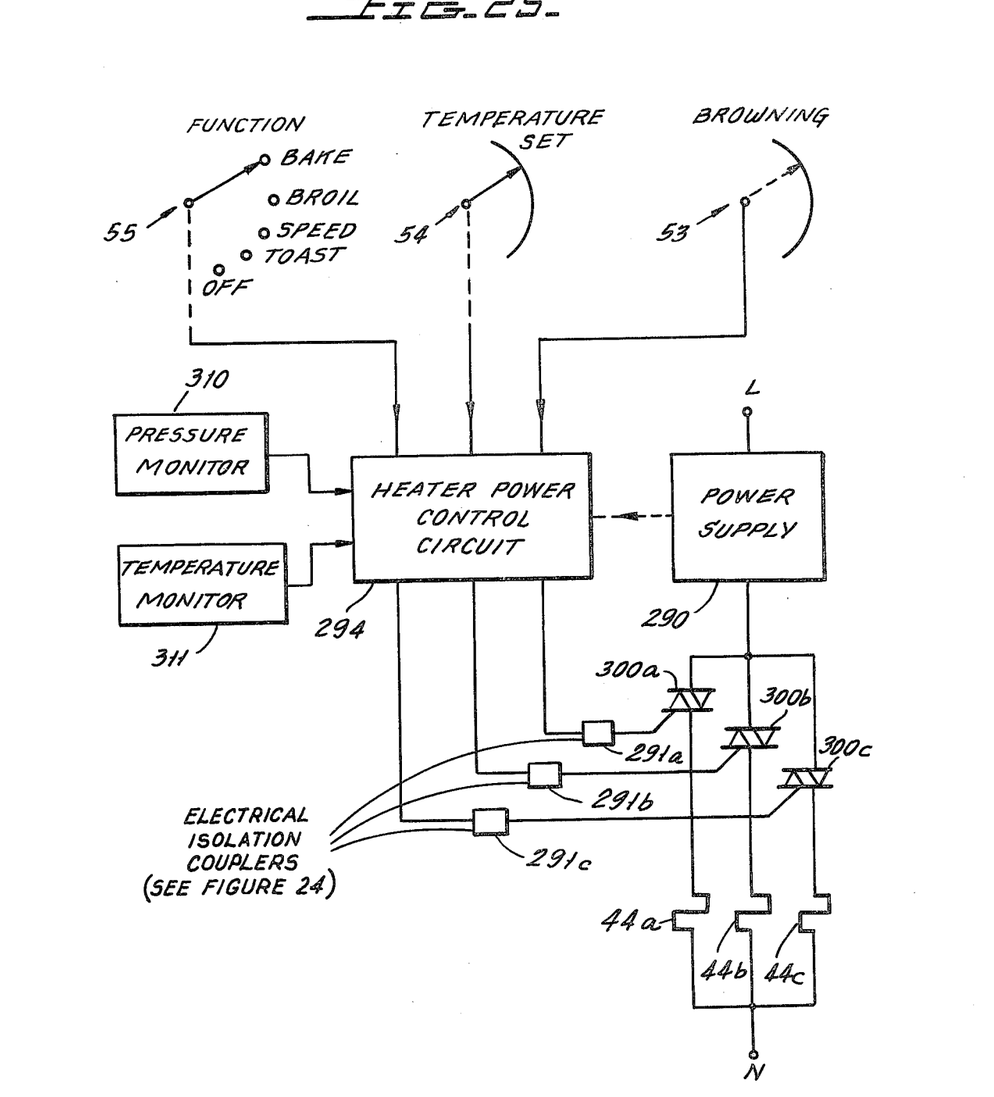
FIG. 25 is a block diagram of the control circuit for applying control signals to the circuit of FIG. 24.

Control 55, shown in FIG. 25, is a switch for selecting between broil, bake, toast and speed modes of operation. The speed mode position calls for pressurized cooking with variable browning.

Control knob 54 controls circuits which in turn control the degree of browning. This is controlled by controlling the length of time that each of the heating rods 44a, 44b and 44c in the system are energized before switching to the next heating rod. The longer a given heating rod is energized, the longer it remains at its maximum temperature and the longer it will give off the high frequency infrared radiation required for browning. If, however, the heating rods are cycled quickly, they will never attain their maximum temperature and, although the same amount of energy is input to the oven cavity, the heat is provided as "black heat" which will cause warming but will not produce a substantial level of infrared radiation.

Figure 24:
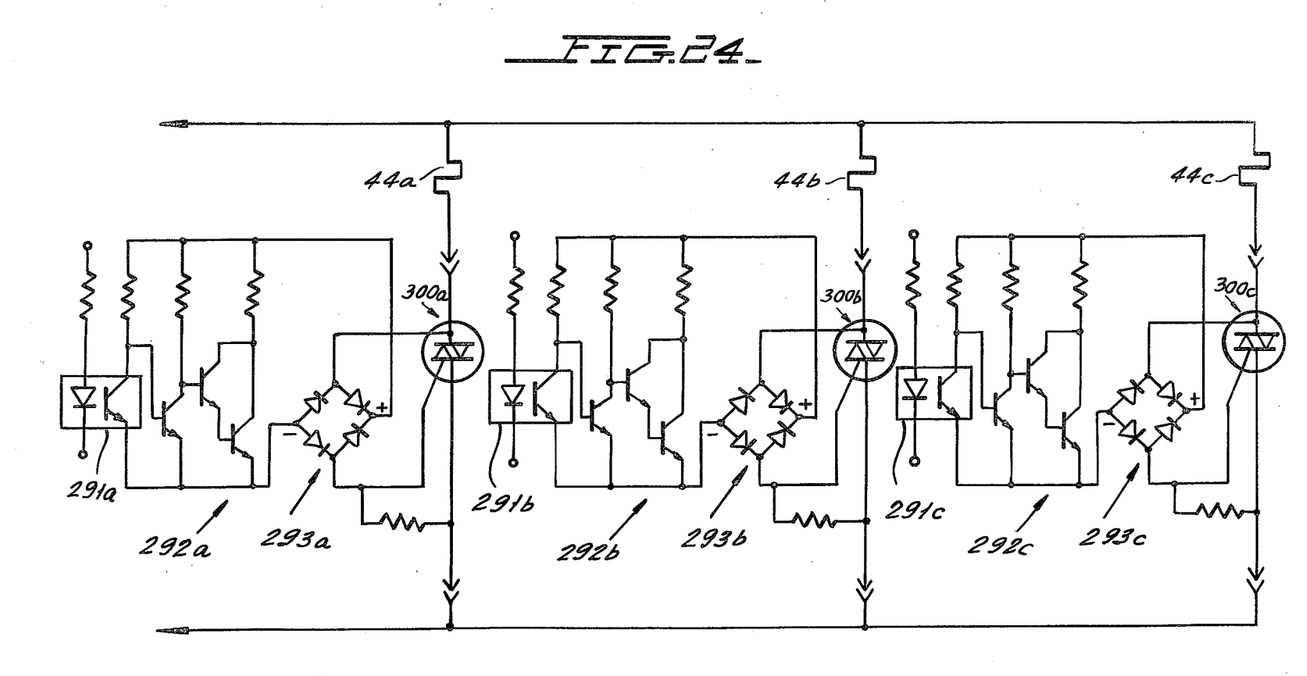
FIG. 24 is a circuit diagram of the power switching circuit which applies power to the upper and lower heating rods.

The power switching circuit 290 of FIG. 25 is shown in FIG. 24 and controls the energy applied to the heating rods 44a, 44b and 44c by controlling the conduction time of triacs 300a, 300b and 300c, respectively which are connected in series with rods 44a, 44b and 44c, respectively. The pairs of series-connected heating rods and triacs are connected between the a-c line L1 and an a-c neutral N. Triacs 300a, 300b and 300c may each be of the Type SC150. They are controlled from optically isolated phototransistor couplers 291a, 291b and 291c, respectively. The outputs of couplers 291a, 291b and 291c are connected through suitable amplifier circuits 292a, 292b and 292c, respectively, to full-wave, bridge-connected rectifiers 293a, 293b and 293c and to the gate circuit of the triacs 300a, 300b and 300c, respectively. Each of the circuits 292a, 292b and 292c are identical and can employ several transistor stages including an input transistor which may be a 2N2222 followed by two further transistors, each of Type D44T8. Suitable biasing and current limiting resistors are employed in the usual manner.

It should be noted that other power switching circuits could be used in place of the circuit of FIG. 24. For example, well-known pulse transformer switching of the triacs could be used or electromechanical relays could be used, if desired.

The photo-isolated input members 291a, 291b and 291c are controlled by a suitable control circuit shown in block diagram form as circuit 294 in FIG. 25. The heater power control circuit 294 of FIG. 25 has numerous inputs which include the function switch 55; an input from a temperature set control 54 which sets the desired oven temperature for a bake or broil mode; and a browning temperature control 53 which sets the degree of browning which is obtained when operated in the speed mode or that mode in which cooking takes place under pressure. Also, input to the control circuit 294 are signals from pressure monitor 310 which can constitute a switch controlled by the steel spring wire 200. This serves as an interlock for the control circuitry to appropriately gate the circuitry for pressure cooking operation. Also provided is a temperature monitor 311 which can be a temperature sensor fixed to the foodstuff being cooked to serve as an input to the control circuit for operating at the temperature set by the control 54.

The heater power control circuit 294 will operate to sequentially energize heater rods 44a, 44b and 44c in either a "black" heat mode in which they are not heated for a sufficiently long time to generate substantial amounts of infrared radiation or an infrared radiation heating mode in which the rods are heated during their heating cycle for a sufficiently long time to become cherry red and become copious sources of infrared radiation. The length of time that each heating rod carries current will be determined by the function or cooking mode which is selected by selection knob 55 and by the browning adjustment set in control 53. A suitable stepping means is also provided within circuit 294 which causes the sequential switching of power from rod 44a and then to rod 44b and then to rod 44c in a continuous manner in order to obtain rotisserie-type of heating which circulates around the foodstuff to be cooked so that even browning is obtained either with or without pressurization of the chamber 30 to produce the full equivalent of rotisserie operation without requiring rotating parts.

The heating elements in FIGS. 3 and 3a are so placed that grease dripping from the foodstuff will not drip onto the heating rods, but rather will fall into a catch pan 45d. The reflectors 44d, 44e and 44f of either FIG. 3a or FIG. 3b cooperate with the lamps or heating rods 44a, 44b and 44c respectively such that they average out the wave mean distance to eliminate hot spots on the foodstuff to the greatest degree possible. Note than any number of elements greater than two units could be symmetrically located around the foodstuff to reduce the possibility of hot spots across the foodstuff. Three heating rods provide uniform heating because of the use of the infrared reflectors which reduces the number of random reflections before the energy intersects the foodstuff to be cooked.

Figure 26:
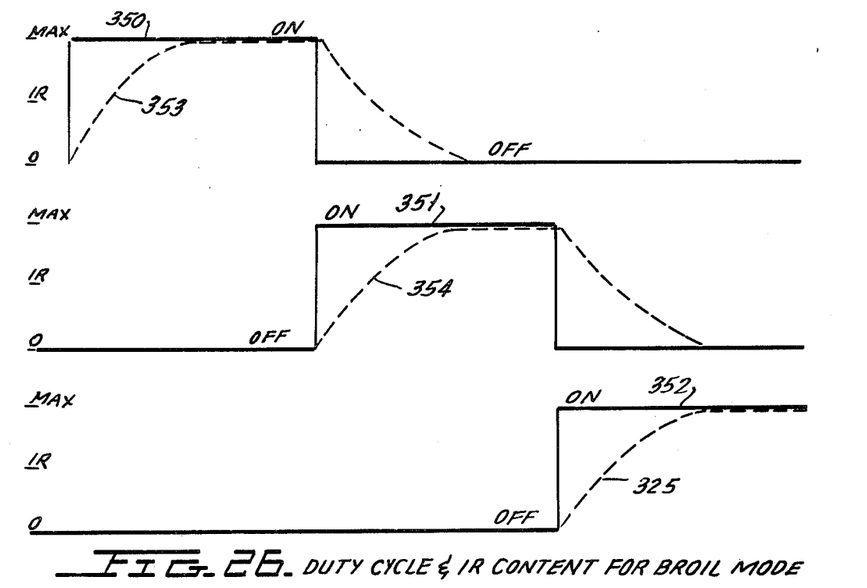
FIGS. 26 and 27 are timing diagrams showing the heating cycles of the heater rods and the output infrared in the broil and bake modes respectively.
Figure 27:
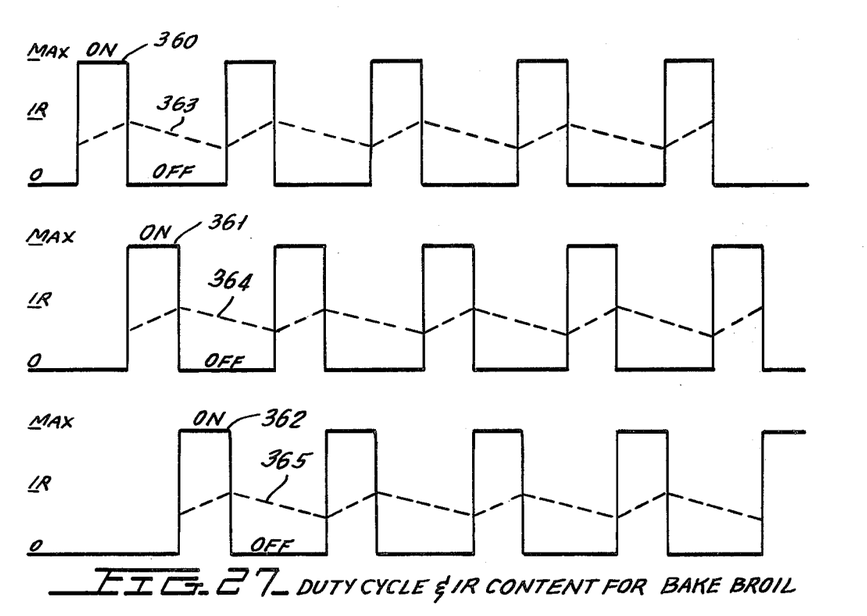

FIGS. 26 and 27 show timing diagrams for the application of power to each of the three elements 44a, 44b and 44c of FIGS. 3 and 3a by the control circuits shown in FIGS. 24 and 25. The timing diagrams show in solid lines the time that the elements conduct current and show in dotted lines the amount of infrared which is contained in the mode of operation. Thus, the mode of operation of FIG. 26 is the broil mode of operation in which the energy from the heater rods has a high amount of infrared whereas the arrangement shown in FIG. 27 is for the bake mode wherein the heat contains relatively little infrared in its spectrum.

Referring to FIG. 26, the solid lines 350, 351 and 352 illustrate the length of time that the heater rods 44a, 44b and 44c are on. Note that as soon as one rod goes off, the next rod to be turned on is immediately energized. If desired, there could be overlap or spacing between the conduction periods of the rods. Also shown in FIG. 26 in dotted lines 353, 354 and 355 is the amount of infrared radiation which appears in the sprectrum of energy put out by the heating rods 44a, 44b and 44c. Note that approximately in the middle of the "on" cycle for each rod its infrared content rises to a maximum.

The heater rods will be energized as shown in FIG. 26 during the broil mode of operation. This mode can be carried out with or without pressurization. Thus, the function switch of FIG. 25 may be connected in the broil mode to obtain broiling without pressure or in the speed mode to obtain broiling with pressure and with the degree of browning being controlled by the setting of switch 53. This degree of browning is in turn controlled by lengthening the time which each heater rod conducts maximum current thereby increasing the amount of infrared which is produced within the oven.

During rotisserie operation the oven door can be closed, the function switch 55 connected to the broil position, and the temperature set control 54 set to any desired temperature which will be maintained through the use of the temperature monitor 311 by conventional control circuit. Typically the duty cycle of FIG. 26 which is required to get substantial infrared radiation produced from conventional Calrod ® type heater elements will be about 15 seconds at which time a bright red color is achieved by the heating element. When the duty cycle is less than 15 seconds, the heater elements 44a, 44b and 44c remain black and do not product substantial infrared radiation.

The bake mode of operation is shown in FIG. 27 where it is seen that the on time for the elements is relatively short and less than 15 seconds so that they do not become efficient radiators of infrared radiation. More specifically in FIG. 27 the conduction time for elements 44a, 44b and 44c is shown by the solid lines 360, 361 and 362 respectively. The infrared radiation which is produced by each element is a relatively low percentage of the total energy put out by the heater element as indicated by the dotted lines 363, 364 and 365 respectively. The bake mode can be carried out with the oven door open or closed, as desired.

In the toast mode, the oven can be operated with all heaters 44a, 44b and 44c turned on without cycling for a given length of time. Note that conventional bake and broil modes can also be arranged by providing control means to turn on only "broil" heater 44b or "bake" heaters 44a and 44c without cycling in the rotisserie mode.

The present invention may be embodied in other specific forms without departing from the spirit or essential attributes thereof and, accordingly, reference should be made to the appended claims, rather than to the foregoing specification as indicating the scope of the invention.

What is claimed is:

1. An interior oven structure comprising:
    a cooking container;
    means within said cooking container for supporting foodstuff in a general central location therein;
    a plurality of electrically individually-energizable cooking heat sources contained totally within said cooking container and spaced from and symmetrically surrounding said generally central location which receives said foodstuff:
    electrical switching means connected to said plurality of electrically individually-energizable heat sources for selectably sequentially switching power to selected ones of said plurality of heat sources to cause the heat energy therefrom to impinge from a cyclically rotating variable direction upon all associated surfaces of said foodstuff and produce rotisserie-type cooking; and
    duty cycle control means connected to said electrical switching means for variably controlling in the selected sequence the switching time and duration characteritics in which said selected ones of said plurality of heat sources are individually energized and deenergized.

2. The interior oven structure of claim 1, wherein at least 3 heat sources are contained within said container.

3. The interior oven structure of claim 1, wherein each of said heat sources comprises at least one parallel elongated rod for producing heat output having relatively low infrared content when energized for a relatively short length of time and for producing heat output having relatively high infrared content when energized for longer than said relatively short length of time.

4. The interior oven structure of claim 3, further including reflector means for concentrating the heat radiation output of each of said heat sources and for reflecting the heat radiation in the direction of said generally central location.

5. The interior oven structure of claim 4, wherein the interior of said container includes walls which are reflective of infrared radiation.

6. The interior oven structure of claim 4, wherein the region of said container below said generally central location is free of any heat source whereby grease dripping from said foodstuff cannot fall on a heat source.

7. The oven of claim 3, wherein the region of said container below said generally central location is free of any heat source whereby grease dripping from said foodstuff cannot fall on a heat source.

8. An interior oven structure comprising:
    a hermetically-sealable cooking container including a door operable to offer access to the interior of said cooking container and closable to seal said cooking container;
    means for supporting foodstuff in a stationary orientation at a generally central region of said cooking container;
    means totally contained with said cooking container for producing steam at greater than atmospheric pressure;
    a plurality of heater means only within said cooking container for sourcing heat energy within said cooking container and surrounding said central region, each of said heater means being individually energizable to produce infrared heat for browning said foodstuff while said cooking container is under greater than atmospheric pressure; and
    electrical switching means connected to said plurality of individually-energizable heater means for selectively sequentially and cyclically switching power to selected ones of said heater means to rotate the direction from which said infrared heat is received by said foodstuff to produce rotisserie-type cooking.

9. The interior oven structure of claim 8, further including pressure relief means connected to said container for venting pressure from the interior of said container when said interior pressure exceeds a predetermined value.

10. The interior oven structure of claim 8, wherein said steam producing means includes a shallow water container disposed adjacent to the top of the interior of said container and between said interior top and one of said heater means.

11. The interior oven structure of claim 8, further including duty cycle control means connected to said electrical switching means for variably controlling in the selected cyclic sequence the switching time and duration characteristics which each of said heater means is energized and deenergized.

12. The interior oven structure of claim 11 wherein each of said heater means comprises means for producing heat output having relatively low infrared content when energized for a relatively short length of time and for producing heat output having relatively high infrared content when energized for longer than said relatively short length of time.

13. The interior oven structure of claim 12, further including reflector means for concentrating the heat radiation output of each of said heat sources and for reflecting the heat radiation in the direction of said generally central location.

14. The interior oven structure of claim 8, wherein the interior of said container includes walls which are reflective to infrared radiation.

15. The interior oven structure of claim 8, wherein the region of said container below said generally central location is free of any heat source whereby grease dripping from said foodstuff cannot fall on a heat source.

16. A process of rotisserie-type cooking, comprising the steps of:

(a) mounting a foodstuff to be cooked in a fixed stationary position in the generally central region of a container of an interior oven structure;

(b) providing a plurality of heat sources, each in a fixed, stationary position surrounding said foodstuff; and (c) sequentially energizing the heat sources to provide a cooking heat source which cyclically rotates around said foodstuff.

17. The process of claim 16, wherein the duty cycle of each of said heat sources is long enough to produce a relatively large proportion of infrared in the heat output.

18. The process of claim 17, further including the step of: (d) pressurizing the interior of said container while said heat sources are energized.

* * * * *